(12) United States Patent
Chimura

(10) Patent No.: US 6,464,145 B1
(45) Date of Patent: Oct. 15, 2002

(54) NON-CONTACT COMMUNICATION DEVICE

(75) Inventor: Shigemi Chimura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/530,581

(22) PCT Filed: Nov. 13, 1998

(86) PCT No.: PCT/JP98/05138

§ 371 (c)(1),
(2), (4) Date: May 4, 2000

(87) PCT Pub. No.: WO99/26354

PCT Pub. Date: May 27, 1999

(30) Foreign Application Priority Data

Nov. 13, 1997 (JP) .............................. 9-311642

(51) Int. Cl.⁷ .............................................. G06K 19/06
(52) U.S. Cl. ........................ 235/492; 235/380; 235/451
(58) Field of Search ................................ 235/492, 380, 235/451

(56) References Cited

U.S. PATENT DOCUMENTS 5,854,481 A * 12/1998 Ricotti et al. ............... 235/492
6,003,777 A * 12/1999 Kowalski ..................... 235/492
6,079,622 A * 6/2000 Goto .......................... 235/492

FOREIGN PATENT DOCUMENTS

| ES | 541323 A | * 5/1993 |
| JP | 63-190559 | 8/1988 |
| JP | 404127291 A | * 4/1992 |
| JP | 5-28328 | 2/1993 |
| JP | 8-185497 | 7/1996 |
| JP | 8-323657 | 12/1996 |

* cited by examiner

Primary Examiner—Karl D. Frech
Assistant Examiner—Allyson Sanders
(74) Attorney, Agent, or Firm—Arent Fox Kintner Plotkin Kahn PLLC.

(57) ABSTRACT

An IC card produces electric power by rectifying a high-frequency signal received from a reader/writer. A MOS transistor is connected to an antenna and the received signal is rectified by the parasitic diode of the MOS transistor. The capacitance accompanying the transistor is added to the capacitance of an input tuning capacitor. Switching the on/off state of the transistor causes the capacitance added to that of the tuning capacitor to change; accordingly, the input tuning frequency changes and the relation between the input tuning frequency and the frequency of the received high-frequency signal changes. As a result, the amplitude of the received high-frequency signal changes and thus the obtained power also changes.

4 Claims, 6 Drawing Sheets

(a)

(b)

NON-CONTACT COMMUNICATION DEVICE

TECHNICAL FIELD

The present invention relates to an information communication device, such as a non-contact tag or non-contact IC card, that processes a signal by obtaining electric power from an electric wave transmitted from an antenna.

BACKGROUND ART

Conventionally, non-contact tags have been in use that transmit the information stored in themselves by acquiring electric power from an electric wave transmitted from somewhere else. Non-contact tags are used, for example, with the lift facilities at a skiing ground, with the ticket examination equipment at a railway station, and for sorting of baggage.

Such a non-contact tag has a transmitter/receiver unit incorporated therein, but not a power source such as a battery. A non-contact tag obtains electric power from an electric wave (a high-frequency signal) it receives. Thus, a non-contact tag, despite incorporating no battery, permits exchange of information for a long period of time. Moreover, a non-contact tag achieves exchange of information by an electric wave or by magnetic induction, and thus offers the advantage of exchanging information on a non-contact basis.

On the other hand, for the purpose of recording or, inversely, offering information, IC cards are already in practical use that permit exchange of information with a reader/writer on a non-contact basis (thus by an electric wave or by magnetic induction). Such an IC card, too, obtains electric power from an electric wave it receives or through magnetic induction.

In FIG. 9, reference numeral 90 represents a reader/writer, with only a transmission antenna (coil $L_S$) provided therein shown as a constituent component thereof. On the other hand, reference numeral 91 represents an IC card, reference numeral 92 represents a tuning circuit thereof, and reference numerals 93 and 94 represent a rectifying diode and a smoothing capacitor, respectively. The tuning circuit 92 is composed of a reception antenna (coil $L_R$) and a tuning capacitor $C_0$. An electric wave transmitted from the reader/writer 90 is received by the tuning circuit. The thus received high-frequency signal is rectified by the rectifying diode 93 and is then smoothed by the smoothing capacitor 94 so as to be used as a power source by the IC card 91.

The intensity (amplitude level) of the high-frequency signal received by and output from the tuning circuit 92 varies according to the distance between the reader/writer 90 and the IC card 91; specifically, the shorter the distance, the more intense the signal, and, the longer the distance, the less intense the signal. Thus, the reproduction efficiency with which electric power is produced by rectifying the received high-frequency signal also varies according to the distance between the reader/writer 90 and the IC card 91.

As a result, quite inconveniently, the range of electric power that needs to be fed to the IC card to ensure its normal operation (in other words, the range of non-contact distance) is rather limited (narrow). Such a limited range of acceptable input voltages makes the IC card unusable in applications in which the input voltage tends to vary greatly. For this reason, it is customary to limit the specifications of IC cards in accordance with their applications (i.e. manufacture separate models for short-distance and long-distance applications). This, however, requires extra cost and causes inconvenience.

Moreover, in this conventional example, a diode is used as a rectifying means, and this diode cannot be used simultaneously as a tuning capacitor. Thus, it is inevitable to provide a capacitor separately in the tuning circuit or secure a capacitance by making the tuning coil larger.

DISCLOSURE OF THE INVENTION

An object of the present invention is to provide a communication device that accepts a larger range of input voltages.

Another object of the present invention is to provide a communication device in which a rectifying means is used to secure a capacitance for a tuning circuit.

To achieve the above objects, according to the present invention, in a communication device that produces electric power by rectifying a received high-frequency signal, a MOS transistor is connected to an antenna so that the received signal is rectified by a parasitic diode of the MOS transistor. In this case, the capacitance accompanying the MOS transistor influences the input tuning frequency.

The communication device may be provided with, as the above-mentioned MOS transistor, one or more MOS transistors, and in addition have control means for controlling the on/off states of the transistors. This control means controls the MOS transistors in such a way as to change the tuning frequency in the direction in which the rectified output becomes equal to a predetermined level. The communication device is built, for example, as an IC card that receives the signal from a reader/writer on a non-contact basis.

Thus, according to the present invention, a communication device produces electric power by rectifying a received high-frequency signal. The received signal is rectified by a parasitic diode of a MOS transistor that is connected to an antenna. The capacitance accompanying the MOS transistor serves as an input tuning capacitance. Switching the on/off state of the transistor causes the capacitance added to that of an input tuning capacitor to change; accordingly, the input tuning frequency changes and the relation between the input tuning frequency and the frequency of the received high-frequency signal changes. As a result, the amplitude of the received high-frequency signal changes and thus the obtained power also changes.

BEST MODE FOR CARRYING OUT THE INVENTION

Figure 1:
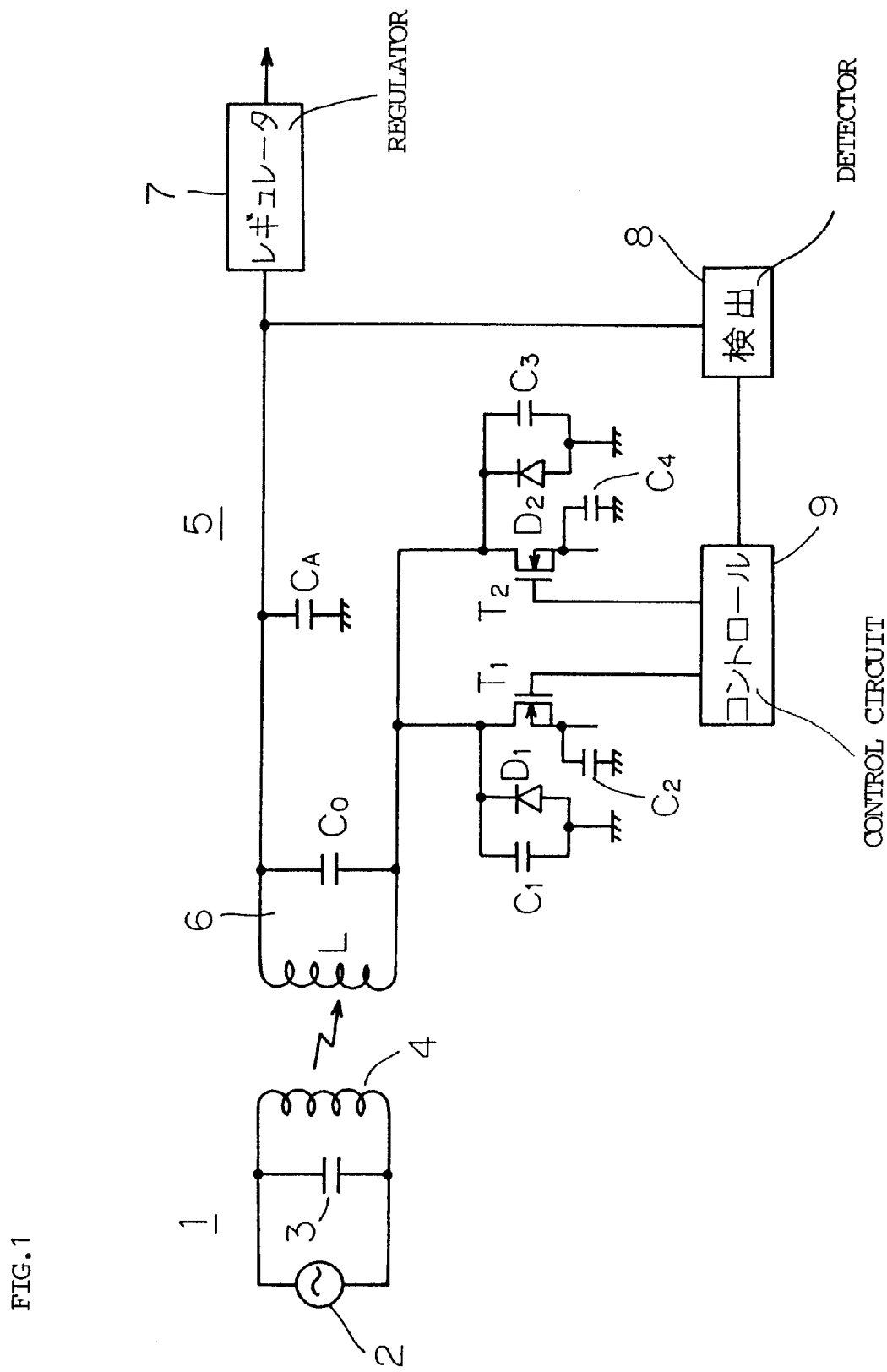
FIG. 1 shows a circuit diagram of a principal portion of the information communication device of a first embodiment of the present invention.

Hereinafter, embodiments of the present invention will be described with reference to the accompanying drawings. In FIG. 1, reference numeral 1 represents a reader/writer, and reference numeral 2 represents a signal source thereof. Reference numerals 3 and 4 represent a capacitor and an inductance coil, which together constitute a tuning circuit of the reader/writer. The inductance coil 4 serves as an antenna.

Reference numeral 5 represents an IC card. Reference numeral 6 represents a tuning circuit thereof, which is composed of an inductance coil L and a capacitor $C_0$. The inductance coil L serves as an antenna. Reference symbol $C_A$ represents a smoothing capacitor connected to one end of the tuning circuit 6, and reference numeral 7 represents a regulator for regulating the output voltage thereof. The output of the regulator 7 is fed to a signal processing circuit (not shown) or the like.

Reference symbols $T_1$ and $T_2$ represent a first and a second MOS transistor, respectively, which are both of an N-channel type, have their drains connected to the other end of the tuning circuit 6 (i.e. to the other end of the antenna L), have their sources left open (non-connected), and have their gates connected to a control circuit 9. Reference numeral 8 represents a detector for detecting the output voltage (or output current) of the smoothing capacitor CA, and its detection output is fed to the control circuit. The control circuit 9 controls the on/off state of the transistors $T_1$ and $T_2$ in accordance with the detection output.

Figure 5:
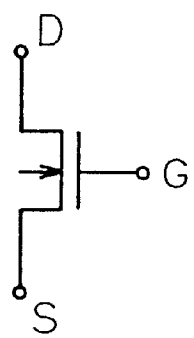
FIG. 5 shows diagrams illustrating the MOS transistor used in the present invention.
Figure 5:
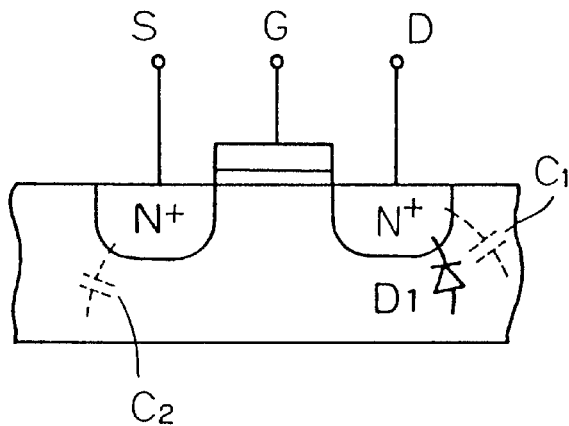

Reference symbols D, and $D_2$ represent parasitic diodes that accompany the MOS transistors $T_1$ and $T_2$. These diodes serve as rectifying diodes. Reference symbols $C_1$ and $C_3$ represent the drain junction capacitances of the transistors $T_1$ and $T_2$, and reference symbols $C_2$ and $C_4$ represent the source junction capacitances thereof. In FIG. 5, at (a) is shown the schematic symbol of an N-channel MOS transistor, and at (b) is shown the structure thereof together with the junction capacitances $C_1$ and $C_2$ and the parasitic diode D, mentioned above. In addition to these junction capacitances, another capacitance also exists between the gate and drain in reality; however, for simplicity's sake, this capacitance is omitted here.

Figure 2:
FIG. 2 shows circuit diagrams illustrating the input tuning circuit thereof.

Now, let the capacitance accompanying the above-mentioned MOS transistors be $C_B$, then the capacitors arranged in an input-side portion of the IC card 5 have a relationship as shown at (a) in FIG. 2. Here, if it is assumed that $C_A$ is much greater than $C_B$ (i.e. $C_A \gg C_B$), then the circuit shown at (a) in FIG. 2 is equivalent to the circuit shown at (b) in FIG. 2. Thus, the tuning frequency f of the tuning circuit is given as $$f = 1/[2\pi\{L(C_0 + C_B)\}^{1/2}]$$

When the transistors $T_1$ and $T_2$ are both off, the source-side capacitances $C_2$ and $C_4$ thereof do not function. Accordingly, as shown at (a) in FIG. 3, $C_B = C_1 + C_3$, and thus the tuning frequency f1 is given as $$f1 = 1/[2\pi\{L(C_0 + C_1 + C_3)\}^{1/2}]$$

When the transistors $T_1$ and $T_2$ are both on, the source-side capacitances $C_2$ and $C_4$ thereof function. Accordingly, as shown at (b) in FIG. 3, $C_B = C_1 + C_2 + C_3 + C_4$, and thus the tuning frequency f2 is given as $$f2 = 1/[2\pi\{L(C_0 + C_1 + C_2 + C_3 + C_4)\}^{1/2}]$$

Figure 3:
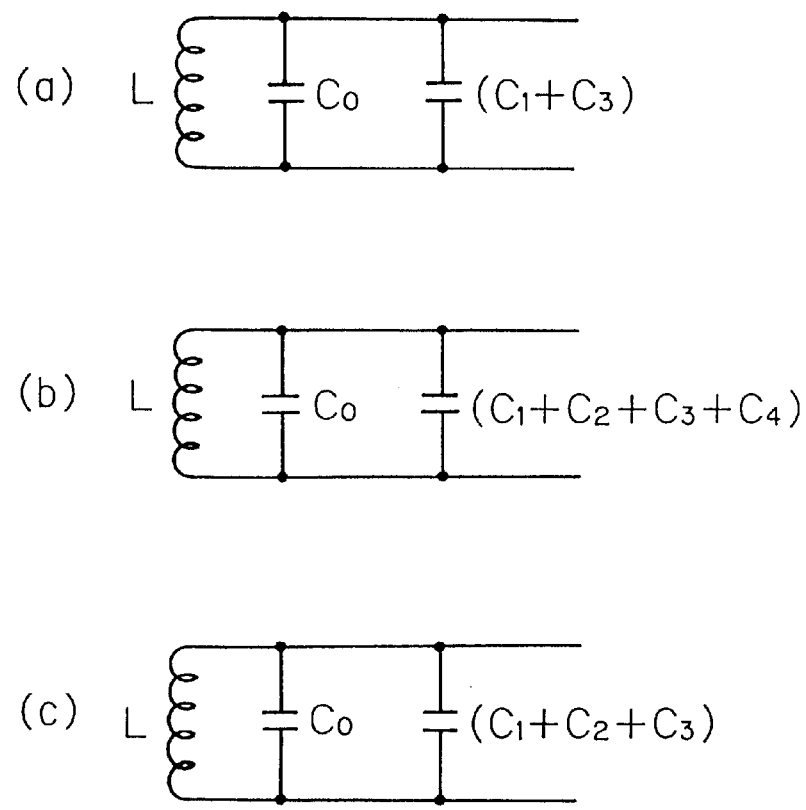
FIG. 3 shows circuit diagrams illustrating how the frequency of the input tuning circuit is changed.

When the transistor $T_1$ is on and the transistor $T_2$ is off, as shown at (c) in FIG. 3, $C_B = C_1 + C_2 + C_3$, and thus the tuning frequency f3 is given as $$f3 = 1/[2\pi\{L(C_0 + C_1 + C_2 + C_3)\}^{1/2}]$$

When the transistor $T_1$ is off and the transistor $T_2$ is on, simply $C_4$ is substituted for $C_2$ in the above equation, and $C_2 = C_4$ from the beginning. Accordingly, also in this case, the tuning frequency equals f3.

Figure 4:
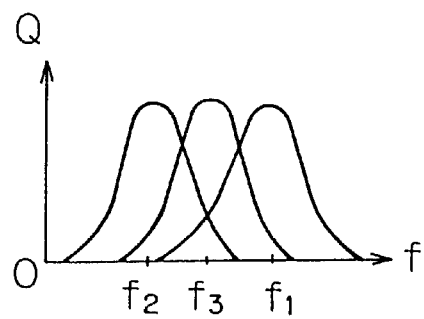
FIG. 4 shows a diagram illustrating how the selectivity of the tuning circuit changes according as the tuning frequency thereof is changed.

The tuning frequencies given above have a relation f2<f3<f1, and this can be illustrated in terms of selectivity Q of the tuning circuit as shown in FIG. 4. Now, suppose that the distance between the reader/writer 1 and the IC card 5 is constant and that the frequency of the high-frequency signal transmitted from the reader/writer 1 equals f1. Under these conditions, when the tuning frequency of the IC card 5 equals f1, the received signal has the largest amplitude, and thus the largest amount of electric power is obtained; when the tuning frequency equals f2, the smallest amount of electric power is obtained; when the tuning frequency equals f3, a medium amount of electric power is obtained. Usually, as long as the tuning frequency is kept constant, the longer the distance between the reader/writer 1 and the IC card 5, the smaller the amount of the obtained electric power.

On the basis of the output voltage (or current) of the smoothing capacitor $C_A$ as detected by the detector 8, the control circuit 9 controls the on/off state of the transistors $T_1$ and $T_2$. For example, the transistors $T_1$ and $T_2$ are controlled in accordance with whether the detected value is greater or less than a previously determined reference value.

In this embodiment, for example when the reader/writer 1 and the IC card 5 are too distant from each other to obtain a sufficient amount of electric power, the tuning frequency of the IC card 5 is set to be equal to f1, at which tuning is achieved perfectly. By contrast, when the reader/writer 1 and the IC card 5 are so close to each other that an excessive amount of electric power is obtained, the tuning frequency of the IC card 5 is set to be equal to f2 or f3, at which tuning is achieved imperfectly.

Here, it is to be noted that the control circuit 9 controls the on/off state of he transistors $T_1$ and $T_2$ solely in accordance with whether the detected voltage (or current) is higher or lower than the reference value and thus irrespective of the distance between the reader/writer 1 and the IC card. Therefore, if a sufficient amount of electric power cannot be obtained even though the reader/writer 1 and the IC card 5 are sufficiently close to each other, the tuning frequency is changed.

Figure 6:
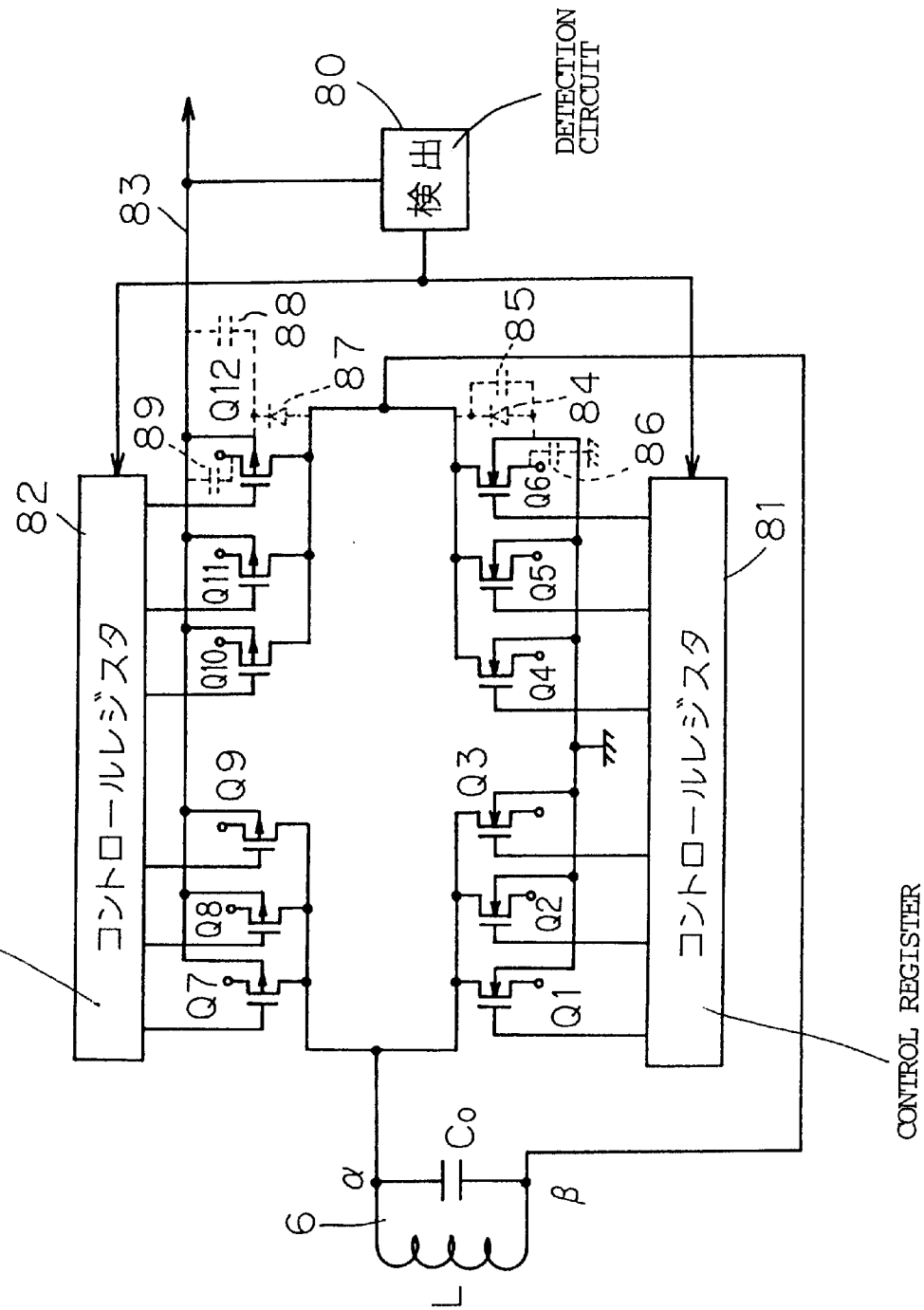
FIG. 6 shows a circuit diagram of a principal portion of the information communication device of a second embodiment of the present invention.

The embodiment described above deals with a case where half-wave rectification is used. However, the present invention can be applied also to cases where full-wave rectification is used. FIG. 6 shows an embodiment for such cases. In FIG. 6, an inductance coil L and a capacitor $C_0$ together constitute a tuning circuit 6, which is, at both ends, connected to a group of MOS transistors.

Reference symbols Q1 to Q6 represent n-channel MOS transistors, and reference symbols Q7 to Q12 represent p-channel MOS transistors. The transistors Q1 to Q3 have their drains connected to one end α of the tuning circuit 6, and have their substrates connected to ground. The transistors Q4 to Q6 have their drains connected to the other end β of the tuning circuit 6, and have their substrates connected to ground. The transistors Q1 to Q6 have their gates connected to a control register 81.

On the other hand, the transistors Q7 to Q9 have their drains connected to one end α of the tuning circuit 6, and have their substrates connected to an output path 83. The transistors Q10 to Q12 have their drains connected to the other end β of the tuning circuit 6, and have their substrates connected to the output path 83. The transistors Q7 to Q12 have their gates connected to a control register 82. The transistors Q1 to Q12 all have their sources left open.

How parasitic diodes and capacitances appear in the n-channel MOS transistors Q1 to Q6 is indicated, using the transistor Q6 as their representative, by reference numerals 84, 85, and 86. Reference numeral 84 represents a parasitic diode that appears between the drain and substrate of the transistor Q6, reference numeral 85 represents a junction capacitance appearing at the same location, and reference numeral 86 represents a source-side junction capacitance.

On the other hand, how parasitic diodes and capacitances appear in the p-channel MOS transistors Q7 to Q12 is indicated, using the transistor Q12 as their representative, by reference numerals 87, 88, and 89. Reference numeral 87 represents a parasitic diode that appears between the drain and substrate of the transistor Q12, reference numeral 88 represents a junction capacitance appearing at the same location, and reference numeral 89 represents a source-side junction capacitance.

Figure 7:
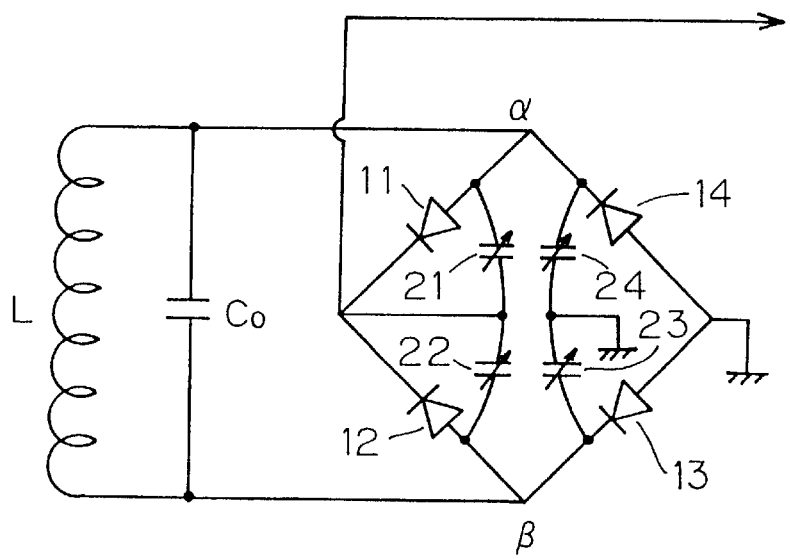
FIG. 7 shows an equivalent circuit diagram illustrating how rectification is achieved therein.

FIG. 7 is an equivalent circuit diagram of the full-wave rectification circuit shown in FIG. 6. A rectifying diode 11 and a capacitor 21 are formed by the transistors Q7 to Q9, and a rectifying diode 12 and a capacitor 22 are formed by the transistors Q10 to Q12. Similarly, a rectifying diode 13 and a capacitor 23 are formed by the transistors Q4 to Q6, and a rectifying diode 14 and a capacitor 24 are formed by the transistors Q1 to Q3. Here, the capacitances of the capacitors 21, 22, 23, and 24 change in accordance with whether the corresponding transistors are on or off.

In accordance with whether the voltage (or current) at the output path 83 is higher or lower than a predetermined value, a detection circuit 80 controls the control transistors 81 and 82 and thereby controls the on/off state of the transistors Q1 to Q12.

In the circuit shown in FIG. 6, where full-wave rectification is used, no smoothing capacitor like $C_A$ shown in FIG. 1 is provided; however, it is of course possible to provide one if required. In both of the embodiments shown in FIGS. 1 and 6, an inductance coil L is used in the tuning circuit 6; however, instead of a coil, it is possible to use anything that serves as an inductance, such as a mere conductor piece, pattern, or the like. The tuning capacitor $C_0$ does not need to be provided separately; instead, it is possible to use the distributed capacitance of the coil L, or to rely totally on the capacitances of the transistors $T_1$ and $T_2$ or Q1 to Q12.

Figure 8:
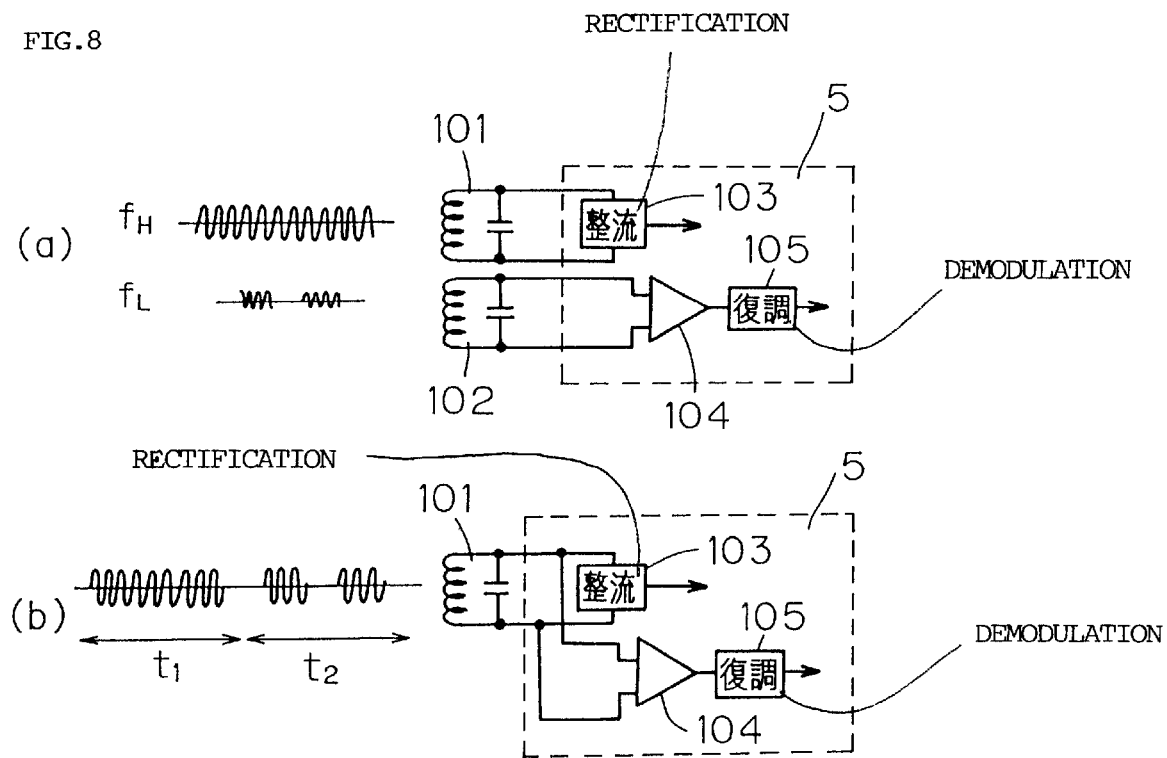
FIG. 8 shows diagrams illustrating how the present invention is used in practice.
Figure 9:
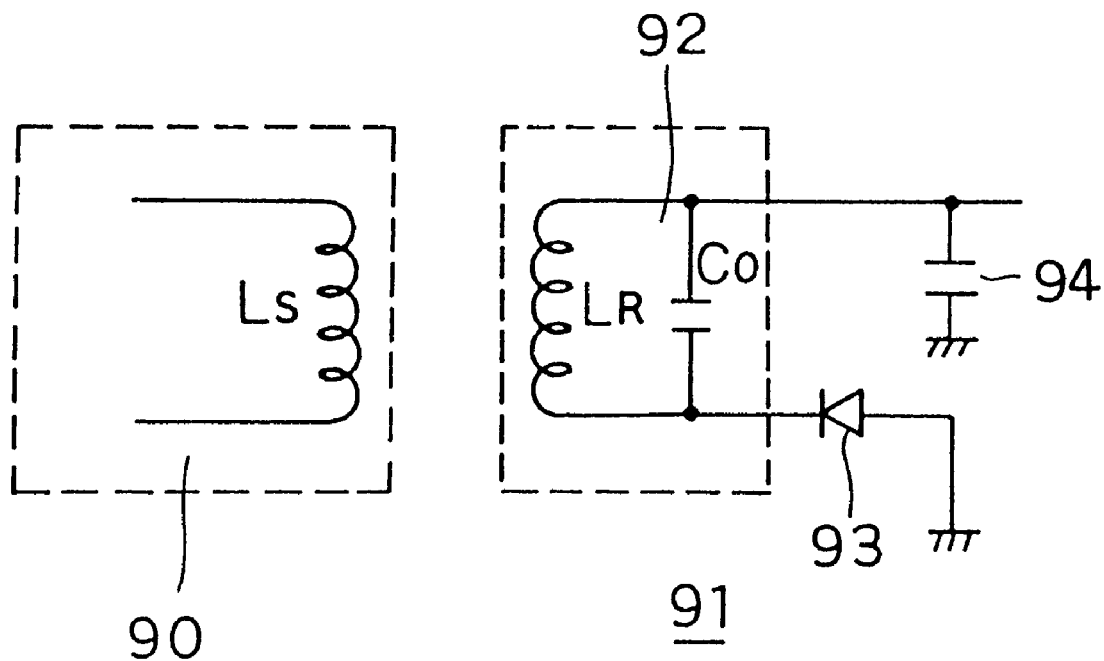
FIG. 9 shows a circuit diagram of a principal portion of a conventional information communication device.

In FIG. 8, at (a) is shown a case where the IC card 5 has separate input tuning circuits 101 and 102, one for electric power reproduction and one for signal transfer, and at (b) is shown a case where the IC card 5 uses a single input tuning circuit 101 for both purposes. In the case shown at (a), the transmitter side transmits a continuous wave having a frequency $f_H$ for electric power reproduction and a signal having a carrier frequency $f_L$. In this case, even if the tuning frequency of the input tuning circuit 101 for electric power adjustment is changed by changing the capacitance of the rectification circuit 103, the tuning frequency of the input tuning circuit 102 for signal transfer is not affected.

In the case shown at (b), on a single carrier having an identical frequency, a signal period t1 for reproduction of electric power and a signal period t2 for transfer of a signal proper are time-shared. In this case, the changing of the input tuning frequency as achieved by the changing of the capacitance of the rectification circuit 103 may be inhibited. However, where insufficiency of the input electric power is correlated with an excessively low level of the signal proper, it is preferable to let the rectification circuit 103 continue the changing of the input tuning frequency even during the signal period.

Industrial Applicability

As described above, according to the present invention, a single device, namely a MOS transistor, can be used simultaneously as a rectifying diode and as a tuning capacitor. In addition, the capacitance (and thus the tuning frequency) can be changed easily by turning on and off the transistor. Moreover, a plurality of MOS transistors can be formed easily in a compact IC. Furthermore, considering that an information communication device incorporates digital circuits for signal processing and that such digital circuits are often formed by the use of MOS transistors, it is preferable, from the viewpoint of designing, manufacture, and costs, to form also rectifying diodes and tuning capacitors by the use of MOS transistors as in the present invention. Offering these advantages, the present invention can be suitably applied to a communication device that produces electric power by rectifying a received high-frequency signal, such as an IC card that receives a signal from a reader/writer on a non-contact basis.

What is claimed is:

1. A communication device that produces electric power by rectifying a received high-frequency signal, the communication device having a rectifying circuit comprised of a MOS transistor of which one of a source and a drain is kept open and of which another of the source and the drain is connected directly to an antenna so that the received signal is rectified by a parasitic diode of the MOS transistor, wherein a junction capacitance accompanying the MOS transistor enables the communication device to vary an input tuning frequency.

2. A communication device as claimed in claim 1, wherein, as the MOS transistor, one or more MOS transistors are provided, and control means is provided for controlling on/off states of the transistors so as to change capacitance of the junction capacitance.

3. A communication device as claimed in claim 2, wherein the control means controls the MOS transistors in such a way as to change a tuning frequency in a direction in which a rectified output becomes equal to a predetermined level.

4. A communication device as claimed in claim 1, wherein the communication device is built as an IC card that receives the signal from a reader/writer on a non-contact basis.

* * * * *